(12) United States Patent
Baier et al.

(10) Patent No.: US 7,500,461 B2
(45) Date of Patent: Mar. 10, 2009

(54) ROTARY COMBUSTION ENGINE, DESIGNED FOR DIESEL FUEL

(75) Inventors: Wolfgang Baier, Obbach (DE); Manfred Mäthner, Leingarten (DE); Dankwart Eiermann, Weissenberg (DE); Rudolf Klotz, Cottbus (DE); Michael Schirmer, Zermsdorf (DE)

(73) Assignee: Wankel Super Tec GmbH, Cottbus (DE)

( * ) Notice: Subject to any disclaimer, the term of this patent is extended or adjusted under 35 U.S.C. 154(b) by 332 days.

(21) Appl. No.: 11/061,834

(22) Filed: Feb. 18, 2005

(65) Prior Publication Data

US 2005/0183691 A1  Aug. 25, 2005

(30) Foreign Application Priority Data

Feb. 20, 2004  (DE) ................ 10 2004 008 312

(51) Int. Cl.
*F02B 53/10* (2006.01)
*F02B 53/12* (2006.01)
*F01C 1/22* (2006.01)

(52) U.S. Cl. .................. 123/205; 239/533.12

(58) Field of Classification Search ......... 123/205–206, 123/210, 211; 239/533.12; 313/141; F01C 1/22; F02B 53/12, 53/10

See application file for complete search history.

(56) References Cited

U.S. PATENT DOCUMENTS

| | | | | |
|---|---|---|---|---|
| 3,196,852 A | * | 7/1965 | Bentele ................... | 123/205 |
| 3,213,836 A | * | 10/1965 | Keylwert et al. ......... | 123/205 |
| 3,246,636 A | * | 4/1966 | Bentele ................... | 123/206 |
| 3,696,796 A | * | 10/1972 | Gavrun .................... | 123/205 |
| 3,698,364 A | * | 10/1972 | Jones ...................... | 123/205 |
| 3,754,534 A | * | 8/1973 | Burley .................... | 123/211 |
| 3,793,996 A | * | 2/1974 | Scheerer ................. | 123/211 |
| 3,831,562 A | * | 8/1974 | Paxton et al. ........... | 123/210 |
| 3,847,517 A | * | 11/1974 | Hermes et al. .......... | 123/205 |
| 3,929,106 A | * | 12/1975 | Scott ...................... | 123/205 |

(Continued)

FOREIGN PATENT DOCUMENTS

DE     3408268     *  9/1985

(Continued)

OTHER PUBLICATIONS

A Translation Patent No. JP 04-298641A.*

(Continued)

*Primary Examiner*—Thai-Ba Trieu
(74) *Attorney, Agent, or Firm*—Cohen Pontani Lieberman & Pavane LLP

(57) ABSTRACT

A rotary combustion engine includes a peripheral housing, side housing plates, a piston, and an eccentric shaft, where the triangular piston mounted on the eccentric shaft rotates between the side plates around an epitrochoidal orbit with a long and short axis inside the housing to form three working spaces, where the gas exchange is controlled by an intake port and an exhaust port. Fuel is supplied by an injection nozzle located on the short axis of the peripheral housing, and combustion is initiated by a spark plug located shortly after the injection nozzle in the housing relative to the direction of rotation of the piston. Nozzle bores in the injection nozzle are designed in such a way that, in conjunction with a multi-fuel injection system, they guarantee reliable ignition of the fuel during each cycle.

8 Claims, 2 Drawing Sheets

U.S. PATENT DOCUMENTS

| | | | | |
|---|---|---|---|---|
| 3,960,115 A | * | 6/1976 | Lamping et al. | 123/206 |
| 3,994,266 A | * | 11/1976 | Jones | 123/205 |
| 3,996,900 A | * | 12/1976 | Feierabend et al. | 123/210 |
| 4,066,044 A | * | 1/1978 | Jones et al. | 123/205 |
| 4,070,995 A | * | 1/1978 | Loyd, Jr. | 123/205 |
| 4,080,934 A | * | 3/1978 | Jones | 123/205 |
| 4,085,712 A | * | 4/1978 | Myers et al. | 123/205 |
| 4,091,789 A | * | 5/1978 | Jones | 123/205 |
| 4,194,486 A | * | 3/1980 | Satow et al. | 123/210 |
| 4,219,003 A | * | 8/1980 | Sato et al. | 123/210 |
| 5,022,366 A | * | 6/1991 | Abraham et al. | 123/205 |
| 5,667,145 A | * | 9/1997 | Schmidt et al. | 239/533.12 |
| 5,818,152 A | * | 10/1998 | Bolduan et al. | 313/141 |

FOREIGN PATENT DOCUMENTS

| | | |
|---|---|---|
| DE | 42 03 091 | 2/1993 |
| JP | 54010834 A * | 1/1979 |
| JP | 04298641 A * | 10/1992 |

OTHER PUBLICATIONS

A translation of Takamoto et al. (Patent No. jp 54-010834 A).*

* cited by examiner

ROTARY COMBUSTION ENGINE, DESIGNED FOR DIESEL FUEL

BACKGROUND OF THE INVENTION

1. Field of the Invention

The invention pertains to a rotary combustion engine, comprising essentially a peripheral housing, side housing plates, a piston, and an eccentric shaft, where the triangular piston mounted on the eccentric shaft rotates inside the housing between the side plates around an epitrochoidal orbit with a long and short axis to form three working spaces, which are separated from each other by the tips of the piston and which pass, in succession, through a four-phase cycle with an ignition-TDC and an overlap-TDC on the short axis and two bottom dead centers on the long axis; where the gas exchange is controlled by an intake port and an exhaust port, the fuel is supplied by an injection nozzle, and combustion is initiated by a spark plug; and where the injection nozzle and the spark plug are located in the housing.

2. Description of the Related Art

The rotary combustion engine known from DE 42 03 091 C1 has an orbit with two arcs inside the housing and a triangular piston (Reuleaux triangle), where, along the orbit, an injection nozzle is provided before, and a spark plug after, the section of the orbit at the axis and opposite the intake ports, and where the nozzle bores of the injection nozzle are directed into the pocket in the face of the piston at a tangent to the inward-rising surface of the section near the axis, the leading edge of the pocket being located under the center axis of the spark plug at the beginning of the injection process. This known design suffers from the disadvantage that, as the tip of the piston at the trailing edge of the compression space is just passing beyond bottom dead center and the compression phase is starting, the tip of the piston at the leading edge of the compression space and the associated volume reach the injection nozzle before the trailing edge has traveled over—and therefore closed off—the intake port. It has been found, namely, that a certain volume around the injection nozzle allows some of the gas mixture in the working space where the pressure is very high because of expansion to blow through into the compression space. This blow-through of gas mixture leads to wide pressure fluctuations and to loud noise in the intake port when this port is still open, and at the same time the degree to which the engine can be filled is also significantly impaired.

SUMMARY OF THE INVENTION

This disadvantage is eliminated according to the invention by shifting the position of the injection nozzle in the direction of rotation so that the tip of the piston at the trailing edge of the compression space has already passed over the intake port by the time the leading tip of the piston reaches the volume around the injection nozzle. It is conceivable that the intake port could be shifted in the direction opposite that of rotation, and this would in fact satisfy the previously described condition, but the predetermined control times make it impossible to implement this idea. As a result of the shape of the volume around the injection nozzle in conjunction with the sealing strip passing above it, flow-through cross sections are obtained, through which a certain amount of already burned gas mixture is forced back from the expansion space into the compression space in a kind of internal exhaust gas return process, as a result of which the reactivity of the as yet unignitable gas mixture is improved and the nitrogen oxide emissions are lowered.

To deal with the situation described above, it is therefore proposed that the injection nozzle be shifted in the direction of rotation up to the short axis to minimize the distance between it and the spark plug, so that, in the TDC position (in abbreviated form: at the ignition-TDC) of the piston, the spark plug can be supplied as quickly as possible with an initial, mostly gaseous, cloud of ignitable mixture with minimal loss. It is advantageous to the combustion process here that modern injection systems can execute multiple injections per stroke, which allow different amounts of fuel to be injected at different times. The ignition of the first jet to be injected determines how the flame will propagate thereafter, for which reason the amount of fuel injected first during the stroke must be so small that it passes over into the gaseous state before it arrives at the electrode of the spark plug, i.e., at least by the time it reaches the deflection radius, so that it can ignite jointly with the air present in the working space by the action of the ignition spark of the spark plug without depositing soot on the plug or burning it off or changing its temperature behavior. After this fuel has been ignited, further injections follow as the size of the working space increases. The injection times and the amounts injected depend on the load states.

To control the ignitability of the fuel by the spark plug even more reliably and also to increase the service life of the spark plug even more, it is proposed that the injection nozzle be provided with additional nozzle bores which are smaller in diameter and which direct a jet of reduced quantity exclusively at the spark plug along a tunnel-shaped guide edge in the housing, whereas the jets of the conventional nozzle bores are directed toward the depth of the working space. The reduced-quantity jet will therefore emerge from the smaller nozzle bores at a shallower angle relative to the epitrochoidal orbit than the jet emerging from the conventional nozzle bores.

At ignition-TDC and also at overlap-TDC, the working space consists of two crescent-shape spaces with mirror-inverted symmetry, which are connected to each other by a pocket in the face of the piston at the narrowest point of the working space. Upon rotation of the piston, the crescent-shaped space which leads in the direction of rotation increases in size, whereas the trailing crescent-shaped space decreases in size to a gap so small that regulated combustion cannot occur. For reasons of exhaust gas quality, exhaust gas temperature, and fuel consumption, no injected fuel should arrive there as long as the piston is located in the TDC position, because these quantities will settle on the walls of the working space and never burn completely. The injection system therefore ensures that the fuel is transported into the leading crescent-shaped combustion space. This is accomplished in part through the positioning of the injection nozzle and the aiming of the jet, but primarily through the shape of the pocket, which, looking in the direction of rotation, enters the face of the piston with practically no transition and then increases in size continuously toward the leading edge. The previously mentioned conditions apply to the case in which the face of the piston is located in the TDC position, where the crucial starting phase of the combustion process takes place. After a few angular degrees of piston rotation, the trailing crescent-shaped working space joins up with the leading crescent-shaped working space to form a single, contiguous working space.

The edge of the pocket which leads in the direction of rotation, furthermore, has a radius, which deflects the ignitable fuel-air mixture introduced by the injection nozzle radially outward and toward the spark plug. It has been found that the spark plug must be positioned in the housing so that, while in the crescent-shaped space, it is relatively close to the short axis, the distance between the plug and the axis being equal, more-or-less, to one-sixth of the distance from one tip of the piston to another.

In all diesel engines, the high compression ratio means that the working space above the piston in its TDC position can have a relatively small compression volume. In a rotary piston engine, this compression volume includes the two crescent-shaped spaces, the volumes under the injection nozzle and the spark plug, and the pocket in the face of the piston. Because the crescent-shaped spaces cannot be changed, it is necessary to minimize the undesirable spaces, especially the one under the spark plug. A special spark plug with an insulator extending all the way to the epitrochoidal orbit avoids an undesirable space while increasing the freedom with which the pocket can be designed.

It is therefore the task of the invention, in a rotary combustion engine designed for diesel fuel, to create the basis for optimal operation under all environmental conditions through the proper positioning of the injection nozzle and of the volume surrounding it in the housing, through the use of a modern injection system, through the proper direction of the jet, and through the proper shape of the pocket in the face of the piston.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
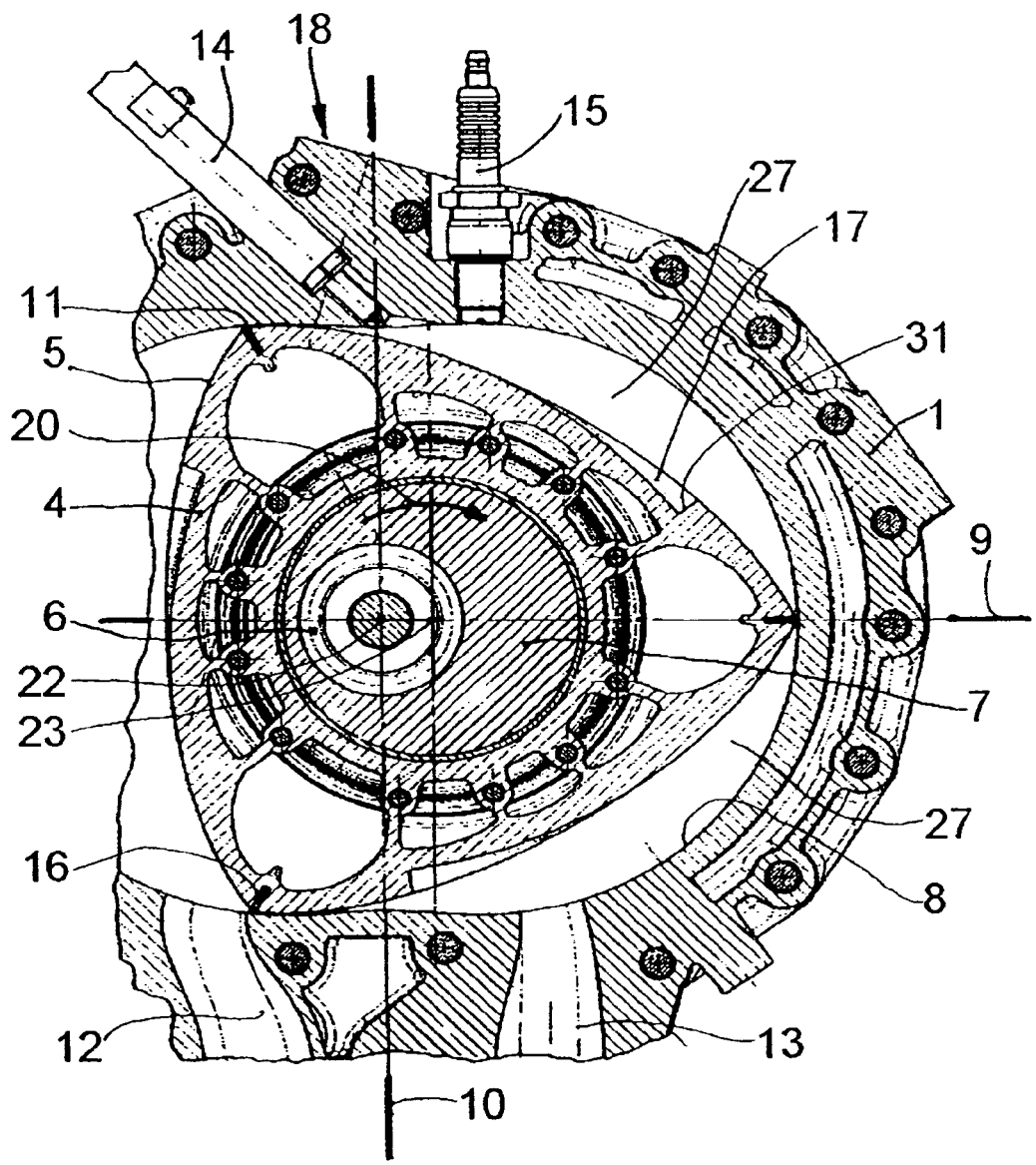
FIG. 1 shows a cross section, perpendicular to the eccentric shaft, of a rotary piston engine designed for diesel fuel with a peripheral housing, a piston, an injection nozzle, a spark plug, and an eccentric shaft.

According to FIG. 1, a peripheral housing 1 works together with a front housing plate 3 on one side and a rear housing plate 2 on the other to form a housing, in which a piston 4 rotates as it forms three variable working spaces 27, in which a four-cycle gas-exchange takes place. The piston 4 is mounted on the eccentric 7 of an eccentric shaft 6. Between two tips 11, the piston 4 has a face 5 with a pocket 17, where the pocket 17 has a radius 31 at its leading edge 25. At the tips 11 of the piston 4 are sealing strips 16, which slide along in the peripheral housing 1 around an epitrochoidal orbit 8 and seal off the three working spaces 27 from each other. According to FIG. 1, one of the three working spaces 27 is located at bottom dead center at the beginning of the compression cycle and is still connected to the intake port 12. The following working space 27, i.e., the one coming next in the direction of rotation 20, is already in a position past the ignition-TDC position 18, at which the gas mixture present in the working space 27 is ignited.

The positional relationships can be described more clearly by reference to the axes of the epitrochoidal orbit 8, namely, the long axis 9 and the short axis 10, which intersect at a center point 22 of the eccentric shaft 6. The center point 23 of the eccentric 7 is also the location of the center of gravity of the piston 4, which rotates a certain distance away from the center 22 of the eccentric shaft. The peripheral housing 1 also has an intake port 12; an exhaust port 13; an injection nozzle 14 with nozzle bores 21 and 33, the nozzle being connected to a modern injection system; and a spark plug 15.

Figure 2:
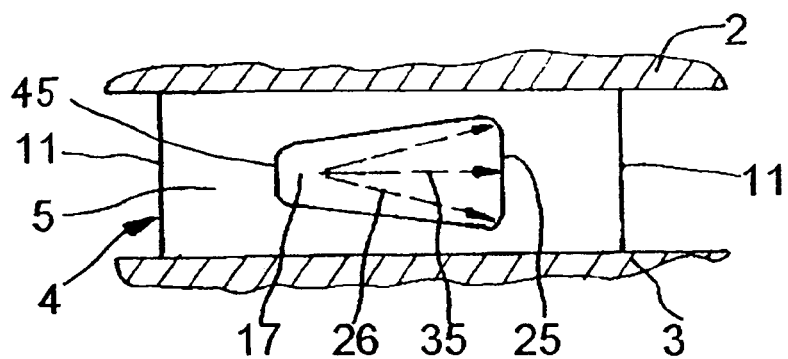
FIG. 2 shows a plan view of the piston with a face and a pocket.

The top view of FIG. 2 shows the arrangement of the pocket 17 in the face 5 of the piston 4, where the pocket 17 becomes deeper and wider as it proceeds from the trailing edge 45 in the direction of rotation 20. This shape conforms to the course of the spray jet 26, which is diverted at the leading edge 25 of the pocket 17 by the radius 31 to form an ignitable gas cloud under the spark plug 15. The other aspects of the shape of the pocket 17 depend essentially on the compression volume, which comprises the two crescent-shaped combustion spaces 24, the volume 32 under the injection nozzle 14, the pocket 17, and an undesirable space 30 under the spark plug 15.

Figure 3:
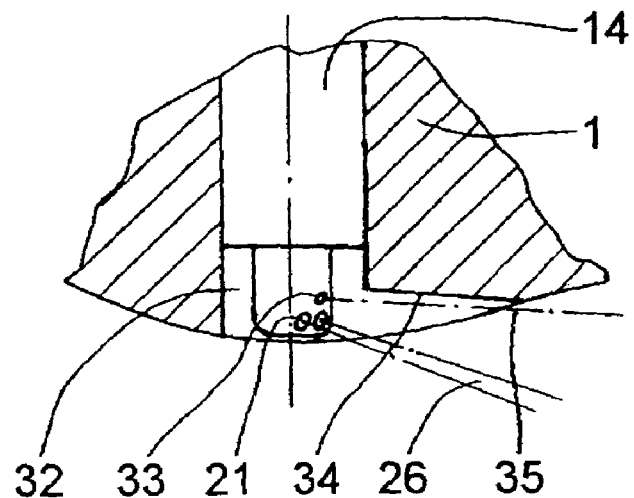
FIG. 3 shows a partial cross section of the arrangement of the injection nozzle with its nozzle bores and the shape of the volume surrounding the injection nozzle.

FIG. 3 shows the position of the injection nozzle 14 with its nozzle bores 21 on the short axis 10 of the peripheral housing 1, the volume 32 around the injection nozzle 14, and the direction of the spray jet 26. According to the invention, however, the injection nozzle 14 has at least one additional, smaller nozzle bore 33, which, during the injection of the fuel, sends out a jet 35 of reduced quantity, which, as already suggested in FIG. 2, is directed exclusively at the spark plug 15 along a tunnel-like guide edge 34 in the peripheral housing 1, whereas the jets 26 of the conventional nozzle bores 21 are directed past the spark plug 15 toward the depth of the working space 27.

Figure 4:
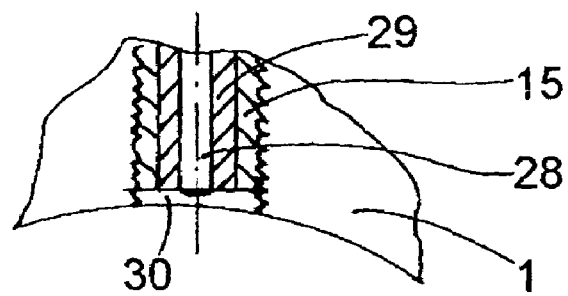
FIG. 4 shows a partial cross section of the arrangement of the spark plug in the housing.

FIG. 4 shows the position of the spark plug 15 in the peripheral housing 1. The spark plug has an electrode 28, which extends to a point close to the epitrochoidal orbit 8, and an insulator 29. There is no way to avoid the formation of an undesirable space 30 facing the epitrochoidal orbit 8, although measures can be taken to minimize it. In the present case, the volume of space 30 is minimized by a spark plug 15 having an electrode 28 and an insulator 29 which extend as close as possible to or is disposed substantially adjacent to the epitrochoidal orbit, as shown.

Figure 5:
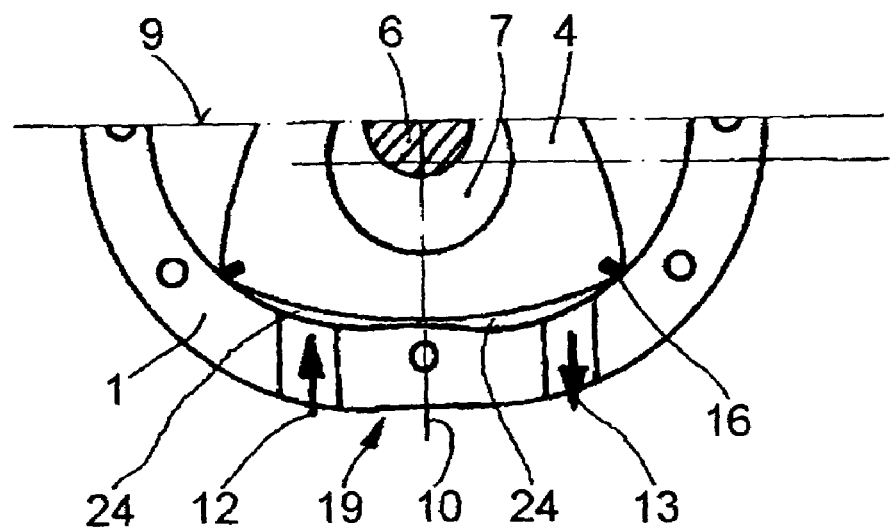
FIG. 5 shows the piston in the housing in the BDC position.

In FIG. 5, the piston 4 is located at the overlap-TDC point 19 of the epitrochoidal orbit 8 of the peripheral housing 1, where the intake port 12 and the exhaust port 13 are connected simultaneously to the working space 27. The working space 27 consists here of the two previously mentioned crescent-shaped spaces 24.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A rotary combustion engine designed for diesel fuel, the engine comprising:
    a peripheral housing describing an epitrochoidal orbit having a long axis and a short axis;
    an eccentric shaft mounted for rotation in a rotational direction;
    a triangular piston mounted on said shaft and having three faces separated by three tips which contact said epitrochoidal orbit to form three working spaces which pass through, in succession, a four-phase cycle with an ignition TDC and an overlap TDC on the short axis and two bottom dead centers on the long axis, each said face having a pocket;
    an intake port and an exhaust port located on either side of the short axis at the overlap TDC;
    a spark plug located after the short axis at the ignition TDC in the rotational direction, wherein the spark plug has an electrode and an insulator which is substantially flush with said electrode, the electrode being disposed substantially adjacent to the epitrochoidal orbit, thereby minimizing space between the spark plug and the orbit; and
    an injection nozzle surrounded by a recess positioned on the epitrochoidal orbit so that one of the tips of the piston does not reach the recess until the next one of the tips has passed the intake port, wherein the injection nozzle comprises a nozzle bore which directs a jet of fuel toward the spark plug, said housing having a guide edge in the housing between the nozzle bore and the spark plug, wherein the recess and the guide edge are shaped so that the tip produces a variable blow-by cross section as the tip passes over the recess and the guide edge.

2. A rotary combustion engine designed for diesel fuel, the engine comprising:
    a peripheral housing describing an epitrochoidal orbit having a long axis and a short axis;
    an eccentric shaft mounted for rotation in a rotational direction;
    a triangular piston mounted on said shaft and having three faces separated by three tips which contact said epitrochoidal orbit to form three working spaces which pass through, in succession, a four-phase cycle with an ignition TDC and an overlap TDC on the short axis and two bottom dead centers on the long axis, each said face having a pocket, wherein each said pocket has a leading edge and a trailing edge;
    an intake port and an exhaust port located on either side of the short axis at the overlap TDC;
    a spark plug located after the short axis at the ignition TDC in the rotational direction, wherein the spark plug has an electrode and an insulator which is substantially flush with said electrode, the electrode being disposed substantially adjacent to the epitrochoidal orbit, thereby minimizing space between the spark plug and the orbit; and
    an injection nozzle located in the housing on the short axis at the ignition TDC, the injection nozzle having at least one bore arranged to inject at least one spray jet of fuel in the rotational direction toward one of said pockets when the respective face is located under the spark plug at the start of injection at ignition TDC,
    wherein said injection nozzle comprises two nozzle bores which direct jets of fuel into the pocket and a nozzle bore which directs a jet of fuel toward the spark plug, the housing having a guide edge between the nozzle bore which directs the jet of fuel toward the spark plug, and the spark plug,
    wherein the injection nozzle is surrounded by a recess, and wherein one of the tips of the piston does not reach the recess until the next one of the tips has passed the intake port, the recess and the guide edge being shaped so that the tip produces a variable blow-by cross section as the tip passes over the recess and the guide edge,
    wherein each said pocket has a deflecting radius at the leading edge which directs an ignitable fuel-air mixture radially outward toward the spark plug.

3. The rotary combustion engine of claim 2 wherein each said pocket has a width and a depth which increase from the trailing edge to the leading edge in the rotational direction.

4. The rotary combustion engine of claim 3 wherein the face of the piston proceeds smoothly into the pocket at the trailing edge.

5. The rotary combustion engine of claim 2 wherein the spark plug is positioned a distance from the short axis which is approximately one-sixth the distance between tips of the piston.

6. The rotary combustion engine of claim 2 wherein the injection nozzle is designed to inject fuel into the pocket so that the fuel forms a gaseous fuel-air mixture by the time the fuel reaches the deflecting radius.

7. The rotary combustion engine of claim 2 wherein the jets of fuel directed into the pocket have a different angle with respect to the injection nozzle than the jet directed toward the spark plug.

8. The rotary combustion engine of claim 2 wherein the nozzle bore which directs a jet of fuel toward the spark plug has a smaller diameter than the nozzle bores which direct jets of fuel into the pocket.

* * * * *